Jan. 18, 1955    D. E. SUNSTEIN    2,700,156
VARIABLE DURATION PULSE RADAR SYSTEM
Filed June 24, 1948    3 Sheets-Sheet 1

INVENTOR.
DAVID E. SUNSTEIN
BY
AGENT

INVENTOR.
DAVID E. SUNSTEIN

Jan. 18, 1955     D. E. SUNSTEIN     2,700,156
VARIABLE DURATION PULSE RADAR SYSTEM
Filed June 24, 1948     3 Sheets-Sheet 3
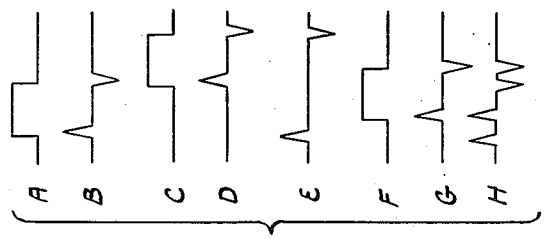
FIG. 4.
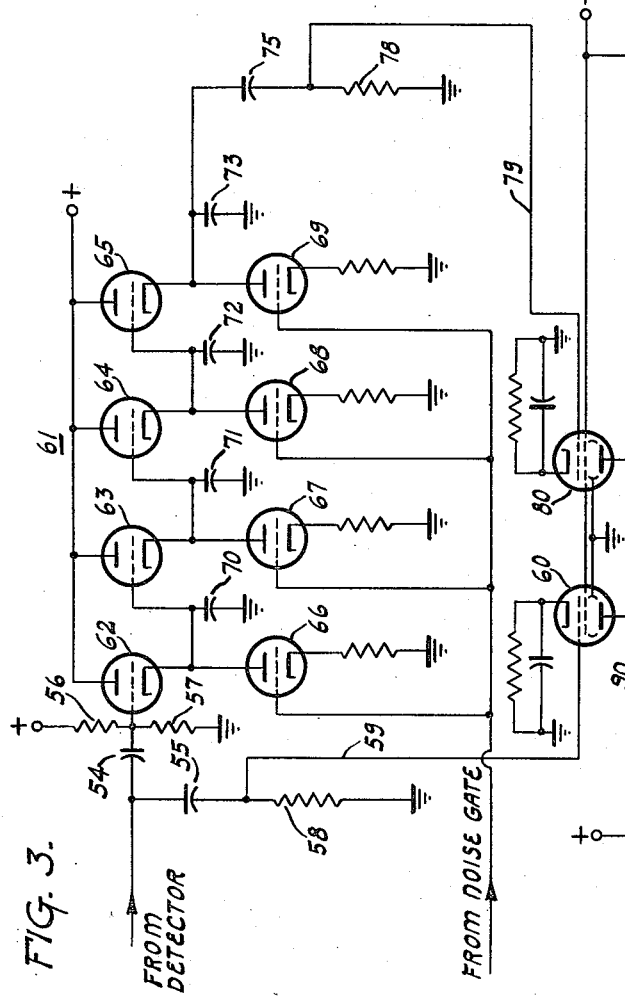
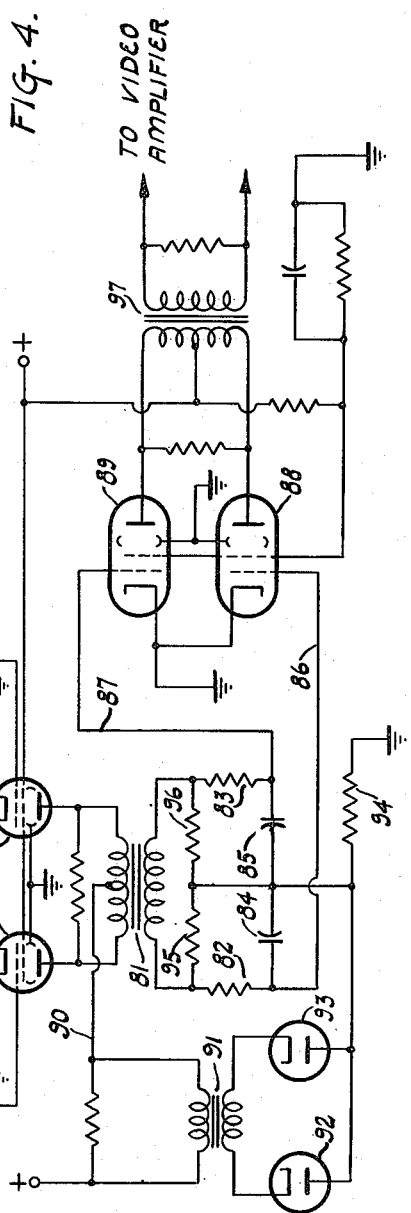
INVENTOR.
DAVID E. SUNSTEIN
BY
AGENT

United States Patent Office 2,700,156
Patented Jan. 18, 1955

2,700,156

VARIABLE DURATION PULSE RADAR SYSTEM

David E. Sunstein, Cynwyd, Pa., assignor to Philco Corporation, Philadelphia, Pa., a corporation of Pennsylvania Application June 24, 1948, Serial No. 34,881

13 Claims. (Cl. 343—13)

This application is a continuation-in-part of application, Serial No. 682,741, filed July 11, 1946, now abandoned.

This invention relates to improvements in radar systems which, for the purposes of this specification, are to be considered to include all systems in which pulses of high frequency electrical energy are transmitted into space to be reflected by target objects, and in which received object-reflected pulses are used to provide information as to the range, direction or position of the reflection-producing objects. More specifically it relates to a system in which the durations of transmitted pulses are varied in a predetermined or random manner and in which the receiver is rendered substantially responsive, at any particular instant of time, only to pulses of durations between certain maximum and minimum range limits which includes the duration of the next previously transmitted pulse. By this means it is possible substantially to eliminate interference with the operation of a radar system by nearby radar systems operating on approximately the same frequency, and, more specifically, in military applications to minimize the deleterious effect of hostile countermeasures.

Accordingly, one object of the invention is to provide a complete radar transmitting and receiving system in accordance with the principles above mentioned and for the purpose specified. Another object is to provide a transmitter capable of transmitting pulse signals of high frequency electrical energy, the durations of which can automatically be made to vary in a predetermined or random manner. Still another object is to provide a pulse signal receiver which can automatically be rendered responsive, at any instant in time, only to pulse signals of durations between predetermined maximum and minimum range limits. A further object of the invention is to provide means for generating pulse signals, the durations of which can automatically be caused to vary in a predetermined or random manner.

Figure 1:
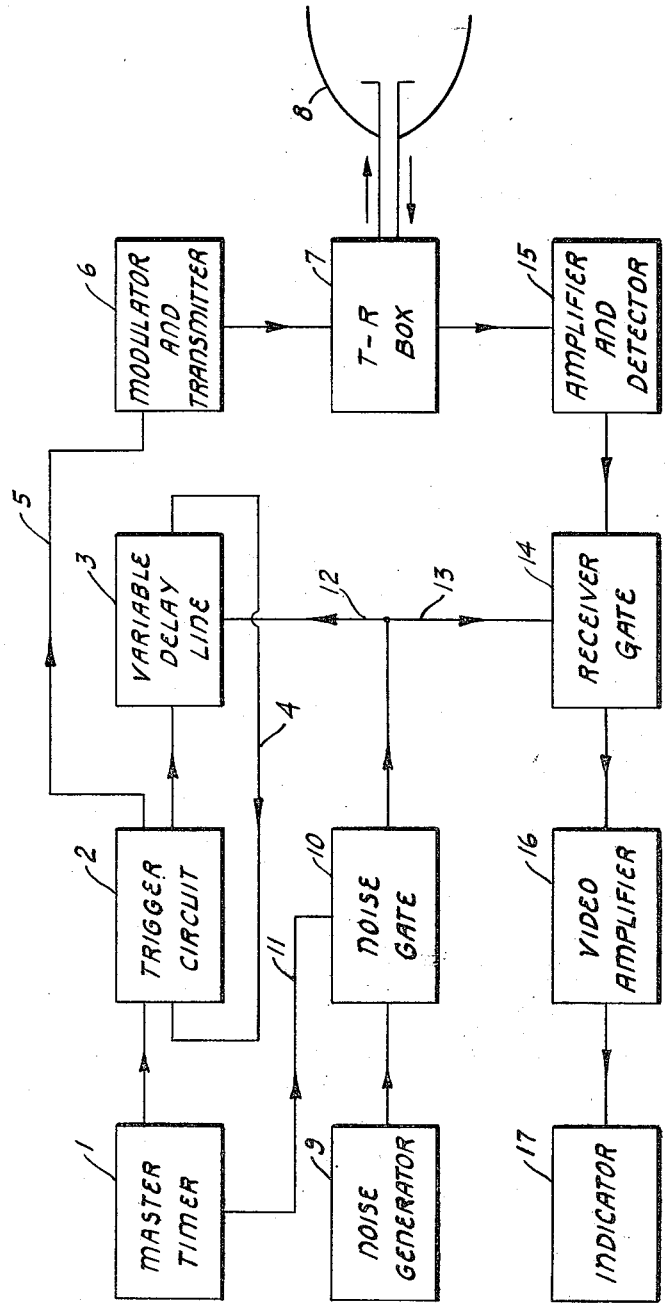
Figure 2:
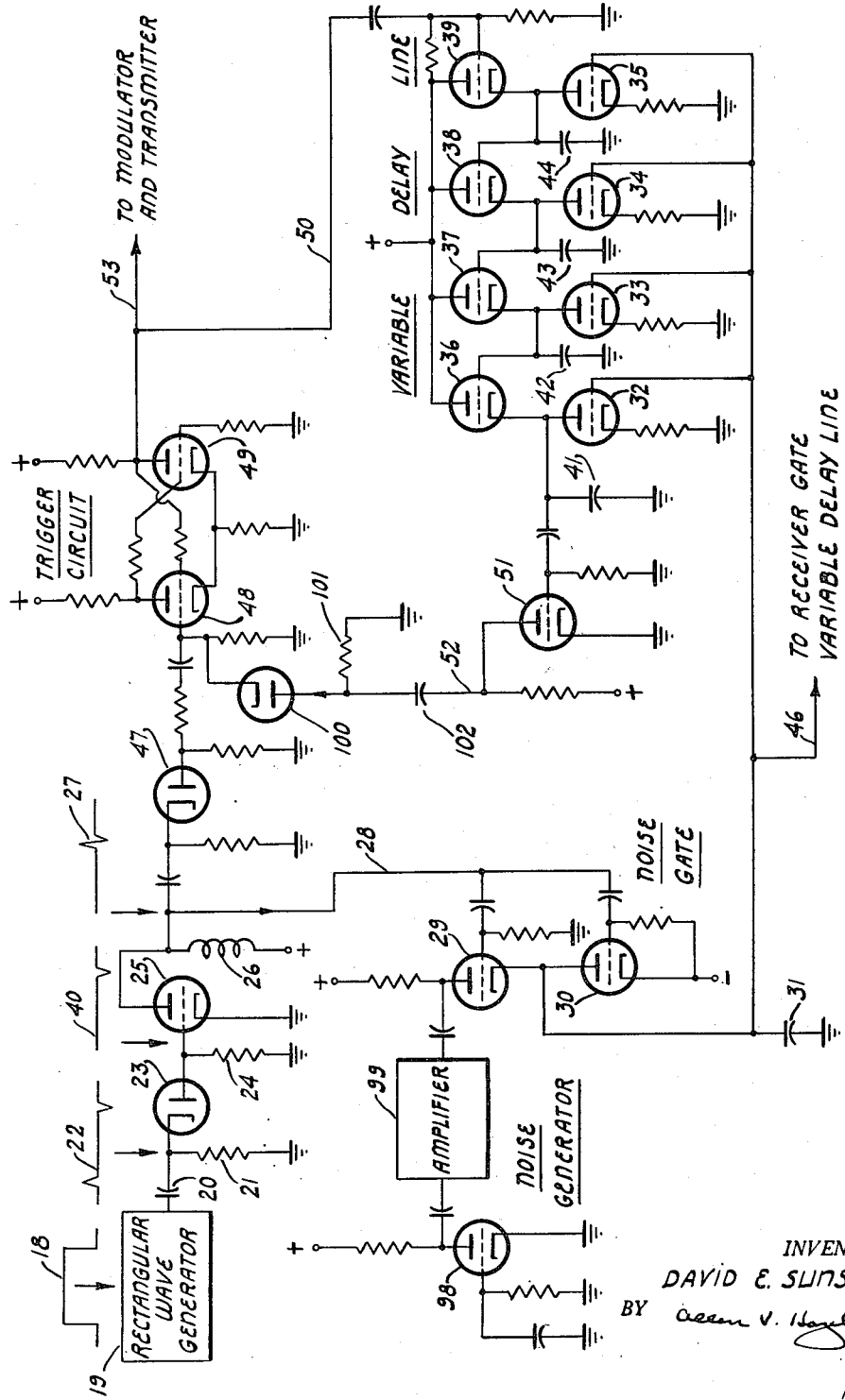

Other objects and advantages of the invention will become apparent from a consideration of the following specification and of the drawings in which:

Figure 1 is a generalized block diagram of the complete radar system in accordance with the invention, Figure 2 is a schematic diagram of a variable duration pulse transmitter according to the invention, Figure 3 is a schematic diagram of a variable duration pulse receiver according to the invention, and Figure 4 comprises representative wave-forms which are referred to in explaining the operation of the variable duration pulse-length discriminator employed in the receiver of Figure 3.

Referring now to Figure 1, the operation of the system as a whole is controlled by master timer 1, which generates periodically recurrent time-spaced pulse signals. These pulses may be of substantially rectangular form and of short duration compared to the intervals between them. As in a conventional radar system, the recurrence frequency will be determined by the maximum range of target upon which the system is to operate. Master timer 1 may comprise any conventional means for generating pulses having these characteristics. It may, for example, include a multivibrator oscillator or an ordinary sine wave oscillator, the output of which is appropriately shaped and modified to produce the desired rectangular pulses of relatively short duration. The trailing edges of pulses from master timer 1 are used to actuate a trigger circuit 2 which may, for example, take the form of a conventional Eccles-Jordan circuit having two normally stable conditions corresponding to different levels of output signal. Trigger circuit 2 is caused to assume one of these stable conditions in response to the trailing edge of a pulse from master timer 1. The response of trigger circuit 2 upon such actuation is supplied to the input of a variable delay line 3, and will appear some time later at the output of said delay line, depending upon the delay produced therein. This delayed response is supplied through connection 4 to the input of trigger circuit 2 to cause it again to assume the condition which obtained prior to triggering by the trailing edge of a pulse from master timer 1. Thus, trigger circuit 2 will be caused to generate pulse signals timed by the pulses from master timer 1, and of duration determined by the amount of delay introduced by variable delay line 3. The means just described for controlling the durations of generated pulses and for generating pulses of varying duration are claimed in my copending application Serial Number 793,742, filed Dec. 24, 1947, entitled Pulse Generator, now abandoned.

The output pulses from trigger circuit 2 are supplied through connection 5 to control the generation, by modulator and transmitter 6, of pulses of high frequency electrical energy, the durations of which will vary in accordance with the variation in the delay of delay line 3. The output of modulator and transmitter 6 is supplied through T-R box 7 to antenna 8 for transmission into space. T-R box 7 is a conventional device, well known in the art, for the purpose of alternately permitting the passage of energy from the transmitter to the antenna, and of received energy from the antenna to the receiver, while minimizing the amount of energy from the transmitter reaching the receiver so as to prevent interference with the operation of the latter and possible destruction of certain of its delicate components.

The amount of delay provided by variable delay line 3 is controlled in a predetermined or preferably random manner by means of noise generator 9 and noise gate 10, the latter being actuated in response to the leading edges of pulse signals from master timer 1 supplied to it through connection 11. Noise generator 9 may comprise a vacuum tube operated at plate-current saturation (i. e. one operated at a plate potential such that, for all normal variations in the cathode emission, electrons will be drawn to the plate at the same rate at which they are emitted from the cathode) followed by suitable amplifiers preferably having maximum response for frequencies in the low audio range. Thus random variations in the plate current of the tube are amplified to provide a signal of randomly varying amplitude. Upon actuation by the leading edge of a pulse from master timer 1, and thus shortly prior to the initiation, by the trailing edge of the same pulse, of the generation of a pulse by trigger circuit 2, noise gate 10 will be opened to permit the signal from noise generator 9 to be applied through connection 12 to variable delay line 3 in such manner as to determine the delay therein. The circuits are so constructed and arranged that this value of delay will persist until the occurrence of the next succeeding master timer pulse and the reactivation thereby of noise gate 10 to redetermine the delay in delay line 3 in accordance with the then existing amplitude of the signal generated by noise generator 9.

The random amplitude of the noise signal at the time of opening of noise gate 10 is also utilized to condition the receiver circuits to receive only signals of duration substantially corresponding to that which the transmitter has been prepared to transmit. This is effected by supplying the signal from noise generator 9 through noise gate 10 and connection 13 to receiver gate 14. Thus, reflections of transmitted pulses from target objects, intercepted by antenna 8 and supplied through T-R box 7 to amplifier and detector 15, will be transmitted by receiver gate 14 to video amplifier 16 so as to operate indicator 17. However, pulse signals of durations appreciably different from those transmitted, which also may be intercepted by antenna 8, will be prevented by receiver gate 14 from reaching video amplifier 16 and indicator 17, and thereby interference with the operation of the radar system will be substantially minimized.

Thus, in summary, it will be seen that the system as shown is caused to transmit pulses of high frequency energy of randomly varying duration, while, at the same time, the receiver is rendered substantially responsive only to those signals of durations substantially corresponding to that of the next previously transmitted signal.

In Figure 2 which shows the details, in accordance with the invention, of the transmitter and control circuits of the system illustrated in Figure 1, rectangular pulse signals 18, of relatively long duration compared to their spacing, are generated by rectangular wave generator 19. These are differentiated in a circuit comprising condenser 20 and resistor 21 to produce appreciably shorter duration pulses 22 timed by the leading and trailing edges of pulses 18. The negative pulses resulting from differentiation are selected by diode 23 and applied to the grid of amplifier tube 25, in the output circuit of which is connected a differentiating inductor 26. The latter differentiates the narrow negative pulses 40 to yield closely spaced positive and negative pips or pulses 27 corresponding respectively to the falling and rising portions of pulses 40. The positive pips, applied through connection 28 to the grids of tubes 29 and 30, cause these tubes to conduct. Tubes 29 and 30, the plate-cathode circuits of which are connected in series, constitute a noise gate in the form of a conventional clamping circuit well known in the art and frequently used in radar systems. A signal of randomly varying amplitude, from a noise generator comprising plate current saturated vacuum tube 98 and associated circuits, is amplified in amplifier 99 and supplied to the plate of tube 29. When tubes 29 and 30 are caused to conduct in response to a positive impulse applied to their grids through connection 28, condenser 31, connecting the cathode of tube 29 and the plate of tube 30 to ground, will commence to discharge through tube 30. However, at the same time, it will commence to be charged through tube 29 to a new potential determined by the instantaneous value of the amplitude of the noise signal applied to the plate of tube 29 at the instant that tube 29 is conducting. The final potential assumed by condenser 31 at the end of the conducting period of tubes 29 and 30 will, except as modified by stray leakage, remain substantially constant until tubes 29 and 30 are again caused to conduct and reestablish the potential of condenser 31 in accordance with a later instantaneous value of the noise signal from amplifier 99. During these intervals the potential across condenser 31 is applied to the grids of tubes 32—35, connected respectively in the cathode circuits of tubes 36—39. Tubes 32—39 cooperate with condensers 41—44, connected as shown, to provide a multi-section variable delay line, the delay of which is determined by the potential applied to the grids of tubes 32—35 from condenser 31. This delay line comprises, in effect, a plurality of cascaded RC sections, each consisting of one of the condensers 41—44 and a fraction of the plate impedance of the triode, to the cathode of which one of the condenser plates is connected. This fraction is determined by the mutual conductance of the triode, and its magnitude is variable in response to variations in the plate current in the triode. The latter is, in turn, controllable throughout a relatively wide range through the medium of a second triode connected in the cathode circuit of the first. Thus, for example, the delay of the section comprising tubes 33 and 37 and condenser 42 will vary as the potential of the grid of tube 33 is varied. Varying the potentials of the grids of each of tubes 32—35 in unison in the same sense will yield a cumulative delay of appreciable and varying magnitude throughout the several sections of the delay line. This arrangement, well known in the art, is fully described in copending application of Millard E. Ames, Jr., Serial Number 563,699, filed November 16, 1944, and assigned to Philco Corporation, which application also describes other equivalents which may be substituted for the specific delay line here shown.

Thus it will be seen that the delay of the variable delay line is established by the potential across condenser 31, which, in turn, is periodically re-established to a random value determined by the instantaneous value of a noise signal at the time of occurrence of the positive pips of wave-form 27, and is maintained at this value until the occurrence of a subsequent positive pip. The potential across condenser 31 may also be supplied through connection 46 to control the receiver (not shown in this figure) and to render it responsive to pulse signals only of duration corresponding to that of those being transmitted.

The potential across condenser 31 is thus re-established just prior to the transmission of a pulse which is initiated a short time later in response to the negative pips of wave-form 27. The latter are selected through the action of diode 47 and are applied to the grid of tube 48, which, together with tube 49 and associated connections, forms a conventional Eccles-Jordan trigger circuit, which is so well known as not to require further description. The negative pulses applied to the grid of tube 48 will cut it off, and at the same time will cause tube 49 to commence conducting. Negative impulses caused to appear on the plate of tube 49 are supplied through connection 50 to the variable delay line. Delayed negative impulses from the output of the delay line are inverted in inverter tube 51 and applied through connection 52 to the grid of tube 48 of the trigger circuit to cause it again to conduct. Thus the trigger circuit is caused to generate negative pulses which appear on the plate of tube 49 and which vary in duration depending upon the amount of delay introduced by the variable delay line. These pulses of randomly varying duration may be supplied through connection 53 to the modulator and transmitter 6 of the system shown in Figure 1 to cause the transmission of corresponding pulses of high frequency energy of randomly varying duration.

As mentioned in the preceding paragraph, when tube 48 is rendered non-conductive in response to the negative pip applied to its grid from diode 47, tube 49 will commence to conduct, and the decrease in potential of the plate of that tube will be transmitted through the variable delay line, inverter tube 51 and connection 52 to the grid of tube 48, where it will appear as a delayed increase in potential which will operate to render tube 48 again conductive and tube 49 non-conductive. Similarly, when this occurs, the plate potential of tube 49 will rise and this change in potential will be applied to the input of the delay line. In the absence of diode 100, included in connection 52 from the output of inverter tube 51 to the grid of tube 48 in the trigger circuit, and so poled as to permit only impulses of positive polarity from tube 51 to be applied to the grid of tube 48, a corresponding negative impulse would subsequently be applied to the grid of tube 48 to cause it to cut off. If, as will generally be the case, the variation in the amount of delay introduced by the variable delay line is restricted to a range of values such that the durations of the negative pulses generated by the trigger circuit and appearing at the plate of tube 49 will always be relatively small compared to the spacing between them, such retriggering of the trigger circuit, by the cutting off of tube 48, will occur considerably in advance of the time at which tube 48 would normally be rendered non-conductive in response to the next negative pulse from diode 47. It will be apparent that such retriggering would be repeated at intervals determined by the magnitude of the delay in the variable delay line, and there would be produced, at the plate of tube 49, a series of pulses of equal duration and spaced by intervals equal to their durations, instead of a single pulse of relatively short duration initiated in response to each of the triggering pips supplied through diode 47 to the grid of tube 48. The inclusion in connection 52 of diode 100, or some similar unilaterally conductive device, appropriately poled, eliminates this difficulty by permitting the application to the grid of tube 48, from the plate of tube 51, of pulses of but a single polarity. Thus when tube 48 has once been rendered conductive in response to a delayed and inverted negative impulse from the plate of tube 49, it will not again be rendered non-conductive until the subsequent application to its grid of a negative triggering pip through diode 47. It will be noted also that preferably there is provided a D. C. connection, through a resistor 101 of suitable value, from the plate of diode 100 to ground. This is to permit dissipation of negative charge which otherwise would accumulate on coupling condenser 102, in response to the negative pips applied to the grid of tube 48, and which would tend to render diode 100 ineffectual to pass positive impulses from tube 51 to the grid of tube 48.

In the circuit according to Figure 3 are shown details of receiver gate 14 of Figure 1, used to render the receiver substantially responsive only to pulse signals of durations corresponding to those transmitted. Received detected pulse signals are differentiated in a circuit comprising condenser 55 and resistor 58, to yield short positive and negative impulses corresponding to their leading and trailing edges. The impulses resulting from differentiation, developed across resistor 58 are supplied through connection 59 to the control grid of isolator tube 60.

Received detected pulses are also supplied through coupling condenser 54 to the input of a variable delay line 61 comprising triodes 62—69 and condensers 70—73. This delay line may be identical in structure to the one used to control the durations of transmitter pulses as shown in Figure 2, and, as already mentioned, may have its delay controlled by the potential developed across condenser 31, which is the same used to control the delay of the transmitter delay line. A voltage divider, consisting of resistors 56 and 57 connected between a source of positive potential and ground, is provided to determine the potential of the grid of the initial tube, 62 of delay line 61. Delayed received pulses from the output of delay line 61 are differentiated in a circuit comprising condenser 75 and resistor 78. The output of the differentiator, containing relatively short duration pulses corresponding to the leading and trailing edges of the delayed received pulse signals, is supplied through connection 79 to the control grid of a second isolator tube 80. The two isolator tubes 60 and 80 are connected to operate in push-pull with a common load impedance comprising the primary winding of transformer 81. In the embodiment shown these tubes are beam-power tubes of the 6AG7 type, which were chosen, because of their large power capabilities, to insure a substantially complete elimination of all received pulses of other than desired duration. The choice in this respect is admittedly conservative and it is quite likely that somewhat smaller tubes would yield satisfactory results. Pulses corresponding to the leading and trailing edges of both delayed and undelayed received pulses appearing in the output of isolator tubes 60 and 80 are supplied through an RC delay circuit, comprising resistors 82 and 83 and condensers 84 and 85, and through connections 86 and 87 to the grids of push-pull amplifier tubes 88 and 89.

Unless received pulses are delayed by delay line 61 by an amount substantially corresponding to their duration, there will appear at the center tap of the primary winding of transformer 81, four separate time-spaced pulses of positive and negative polarity corresponding to the leading and trailing edges of the delayed and undelayed received pulses. These are applied through connection 90 and transformer 91 to a full-wave rectifier circuit comprising diodes 92 and 93 to develop across resistor 94 a negative biasing voltage which is applied through resistors 95, 96, 82 and 83 and connections 86 and 87 to the control grids of tubes 88 and 89 to bias them to cut-off, and thereby to prevent the transmission to their output circuit of any signal supplied to their control grids from the output circuits of tubes 60 and 80. It is to be noted that any time delay in this bias, as developed by the full-wave rectifier, with reference to the signal appearing in the secondary winding of transformer 81, is compensated by delaying the last-named signal in the RC delay network 82, 83, 84, 85 already referred to. However, if the delay in delay line 61 corresponds substantially to the duration of received pulses, the trailing edge of the undelayed pulse will correspond with the leading edge of a delayed pulse, as a result of which, the positive and negative pips resulting from differentiation of these trailing and leading edges will cancel out at the center tap of the primary winding of transformer 81, so that no bias will thereby be produced by the full-wave rectifier and a composite pulse, consisting of the added pips corresponding respectively to the trailing edge of the undelayed received pulse and the leading edge of the delayed received pulse, appearing in the secondary winding of transformer 81, will be transmitted through tubes 88 and 89 to their output circuit and thence through transformer 97, the secondary of which may be connected to the input circuit of video amplifier 16 of the system shown in Figure 1.

The operation of the receiver gate, the structure and operation of which has just been described, will perhaps be more clearly understood by reference to the waveforms shown in Figure 4. At A is represented a received detected pulse as supplied to differentiator 55, 58 and to the input of variable delay line 61. At B are represented the positive and negative pips resulting from the differentiation of the pulse shown at A, which will appear on the grid of tube 60. At C is shown the delayed received pulse appearing in the output circuit of delay line 61 when the delay is equal to the delay of the pulse shown at A. At D are shown the positive and negative pips corresponding to the leading and trailing edges of the delayed pulse shown at C. At E is shown the resultant of the addition of waveforms B and D, such as will appear at the center tap on the primary winding of transformer 81, and in which the negative pulse B cancels the positive pulse of D. At F is shown a pulse delayed by an amount less than the duration of the received pulse shown at A, and at G, the result of differentiating this pulse. Combining the waveform at B with that shown at G yields the waveform H in which pips corresponding to both leading and trailing edges of both delayed and undelayed received pulses are present, and in which there is no cancellation. As a result a negative bias is developed at a time corresponding to the trailing edge of the received pulse A, and therefore no signal can be transmitted to the video amplifier.

It is particularly to be noted that the circuit will function in the manner described regardless of the polarity of received detected pulses supplied to it. Thus, considering the operation of the system as a whole, it will provide the desired discrimination regardless of differences in target reflectivities and even when, as may frequently be the case, two or more received pulses occur partially contemporaneously.

As already mentioned, the circuit arrangement just described forms the receiver gate of the combined transmiting and receiving system shown in Figure 1 and to which this invention relates. It is controlled in the manner already discussed so as to render the receiver responsive only to pulse signals of durations substantially corresponding to the next previously transmitted pulse. As explained, this control can be effected through the same means that is used to control and vary the durations of successive transmitted pulses.

The receiver gate or variable duration pulse discriminator does not itself constitute a part of the invention hereinafter claimed but is claimed in my copending application, Serial Number 686,707, filed July 27, 1946. As will be apparent to those skilled in the art other forms of pulse length discriminators may be substituted for the one shown. However, it should be noted, that the use of certain such devices will render it impossible to achieve at least certain of the desirable features hereinbefore set forth. Other alterations to the present invention, which are within the scope thereof as defined by the appended claims, will occur to those skilled in the art to which it pertains.

I claim:

1. In a radar system, a transmitter of time-spaced pulses of high frequency energy, said transmitter being controllable to vary the durations of pulses transmitted thereby, means for controlling said transmitter to cause the durations of successive pulses to vary in a predetermined manner, a receiver for receiving reflections of said transmitted pulses from target objects, means for rendering said receiver selectively responsive to receive exclusively, at any given time, pulses which are of substantially a predetermined duration, said last-named means being controllable to vary the responsiveness of said receiver and to render it selectively responsive at different times to receive pulses of different durations, and means for controlling said last-named means in accordance with the duration of the next previously transmitted pulse to maintain said receiver continually responsive to receive only pulses of durations substantially equal to the duration of said next previously transmitted pulse.

2. A radar system according to claim 1 in which said transmitter is controlled so as to cause the durations of successive pulses to vary in a random manner.

3. In a radar system, a transmitter of time-spaced pulses of high frequency energy, said transmitter being controllable to vary the durations of pulses transmitted thereby, a receiver for receiving reflections of said transmitted pulses from target objects, means for rendering said receiver selectively responsive to receive exclusively, at any given time, pulses which are of substantially a predetermined duration, said last-named means being controllable to vary the responsiveness of said receiver and to render it selectively responsive at different times to receive pulses of different durations, and common means for controlling both said transmitter and said last-named means to vary simultaneously the durations of said transmitted pulses and the responsiveness of said receiver in a manner to maintain said receiver continually responsive to receive pulses of durations substantially equal to the duration of the next previously transmitted pulse.

4. A radar system according to claim 1 in which said means for controlling said transmitter comprises: a variable signal delay device, means for varying the delay of said device in a predetermined manner, and means for determining the durations of successive transmitted pulses in accordance with the instantaneous values of the delay of said delay device at successive, time-spaced instants of time.

5. A radar system according to claim 3 in which said common controlling means for effecting simultaneous variation of the durations of said transmitted pulses and the responsiveness of said receiver is operative to maintain said receiver selectively responsive to receive pulses of substantially the same duration during the major portion of each interval between successive transmitted pulses, and to alter the responsiveness of said receiver immediately prior to the transmission of the next subsequent transmitted pulse.

6. A radar system according to claim 1 in which said means for controlling said transmitter comprises: a source of a signal having a characteristic which varies in a predetermined manner, and means for utilizing said signal to control said transmitter to cause the durations of successive transmitted pulses to vary in accordance with the variations of said characteristic.

7. A radar system according to claim 3 in which said common controlling means for effecting simultaneous variation of the durations of said transmitted pulses and the responsiveness of said receiver comprises: a source of a signal having a characteristic which varies in a predetermined manner, and means for utilizing said signal to cause the durations of said transmitted pulses and the responsiveness of said receiver to vary in accordance with the variations of said characteristic.

8. A radar system according to claim 7 in which said common controlling means for effecting simultaneous variation of the durations of said transmitted pulses and the responsiveness of said receiver is operative to maintain said receiver responsive to receive pulses of substantially the same duration during the major portion of each interval between successive transmitted pulses, and to alter the responsiveness of said receiver in accordance with the instantaneous value of said characteristic of said signal at a time immediately prior to the transmission of the next subsequent transmitted pulse.

9. A radar system according to claim 1 in which said means for controlling said transmitter comprises: an electrical storage element, means for controlling said transmitter to determine the durations of said transmitted pulses in accordance with the quantity of electricity momentarily stored in said storage element, and means for redetermining the quantity of electricity stored in said element at time-spaced instants of time.

10. In a radar system, a source of time-spaced pulse signals, a transmitter actuated in response to pulse signals from said source to transmit successive time-spaced pulses of high frequency energy of progressively varying durations, a receiver for receiving reflections of said transmitted pulses from target objects, means for normally maintaining said receiver selectively responsive to receive exclusively pulses of substantially the same duration, said last-named means being controllable to alter the responsiveness of said receiver and to render it selectively responsive to receive pulses of different duration, and means actuated in response to each successive pulse signal from said source for controlling said last-named means to render said receiver selectively responsive to receive only pulses of durations substantially equal to the duration of the pulse of high frequency energy transmitted in response to said pulse signal.

11. A radar system according to claim 3 in which said common controlling means for effecting simultaneous variation of the durations of said transmitted pulses and the responsiveness of said receiver comprises: means responsive to an intermittently applied control signal to determine the durations of said transmitted pulses and the responsiveness of said receiver in accordance with the value of a predetermined characteristic of said control signal at the time of application of said control signal, and for maintaining said receiver responsive to receive pulses of substantially the same duration throughout the intervals between successive applications of said control signal, and means for applying intermittently to said last-named means a control signal having a predetermined characteristic which varies.

12. In a radar system, a source of time-spaced pulse signals, a transmitter actuated in response to the trailing edges of pulse signals from said source to transmit successive time-spaced pulses of high frequency energy, said transmitter being controllable to vary the durations of pulses transmitted thereby, a receiver for receiving reflections of said transmitted pulses from target objects, means for normally maintaining said receiver selectively responsive to receive exclusively pulses of substantially the same duration, said last-named means being controllable to alter the responsiveness of said receiver and to render it selectively responsive to receive pulses of different durations, and means actuated in response to the leading edges of pulse signals from said source for controlling said transmitter to vary the durations of said transmitted pulses and for simultaneously controlling said last-named means to maintain said receiver continually selectively responsive to receive only pulses of durations substantially equal to the duration of the next previously transmitted pulse.

13. In a radar system, a source of time-spaced pulse signals, a transmitter actuated in response to a predetermined characteristic portion of pulse signals from said source to transmit successive time-spaced pulses of high frequency energy, said transmitter being controllable to vary the durations of pulses transmitted thereby, a receiver for receiving reflections of said transmitted pulses from target objects, means for normally maintaining said receiver selectively responsive to receive exclusively pulses of substantially the same duration, said last-named means being controllable to alter the responsiveness of said receiver and to render it selectively responsive to receive pulses of different durations, and means actuated in response to an earlier characteristic portion of pulse signals from said source for controlling said transmitter to vary the durations of said transmitted pulses and for simultaneously controlling said last named means to maintain said receiver continually selectively responsive to receive only pulses of durations substantially equal to the duration of the next previously transmitted pulse.

References Cited in the file of this patent

UNITED STATES PATENTS

| | | |
|---|---|---|
| 2,433,681 | Blumlein | Dec. 30, 1947 |
| 2,433,838 | Elie | Jan. 6, 1948 |
| 2,500,638 | Krauth | Mar. 14, 1950 |